United States Patent [19]
Menchetti et al.

[11] Patent Number: 5,483,777
[45] Date of Patent: Jan. 16, 1996

[54] UTILITY BOX MOUNTING PLATE AND Z-STUD

[75] Inventors: Robert J. Menchetti, Buffalo; Matthew J. Kessler, Depew, both of N.Y.

[73] Assignee: National Gypsum Company, Charlotte, N.C.

[21] Appl. No.: 189,052

[22] Filed: Jan. 31, 1994

[51] Int. Cl.⁶ .................................................. E04B 2/60
[52] U.S. Cl. .......................... 52/481.1; 52/690; 52/731.7; 52/731.8; 52/731.9; 248/205.1; 248/300; 248/906
[58] Field of Search ...................... 52/481.1, 690, 52/731.7, 731.8, 731.9; 248/205.1, 300, 906

[56] References Cited

U.S. PATENT DOCUMENTS

| | | | |
|---|---|---|---|
| 2,209,514 | 7/1940 | Drummond | 52/481.1 X |
| 3,101,817 | 8/1963 | Radek | 52/731.9 X |
| 3,701,836 | 10/1972 | Ward et al. | 52/731.7 X |
| 4,443,983 | 4/1984 | Karlstrom . | |
| 4,461,134 | 7/1984 | Lowe | 52/731.7 |
| 4,576,302 | 3/1986 | Smolik | 248/906 X |
| 4,787,587 | 11/1988 | Deming | 248/906 X |
| 5,079,884 | 1/1992 | Menchetti | 52/731.7 |
| 5,114,105 | 5/1992 | Young | 248/906 |
| 5,157,883 | 10/1992 | Meyer . | |

*Primary Examiner*—Carl D. Friedman
*Assistant Examiner*—Christopher Todd Kent
*Attorney, Agent, or Firm*—Marshall, O'Toole, Gerstein, Murray & Borun

[57] ABSTRACT

A generally flat attachment plate for providing a mounting surface on a side of a Z-stud, which surface is perpendicular to the Z-stud flanges. The plate has tongues on one edge engaging an inwardly directed lip on the Z-stud flange, and means on the opposite edge to affix the plate to the angled web of the Z-stud, such as by tabs which fit into slots on the web. The Z-stud has two rows of slots for use in mounting the plates or for suspending the Z-stud from a ceiling.

18 Claims, 3 Drawing Sheets

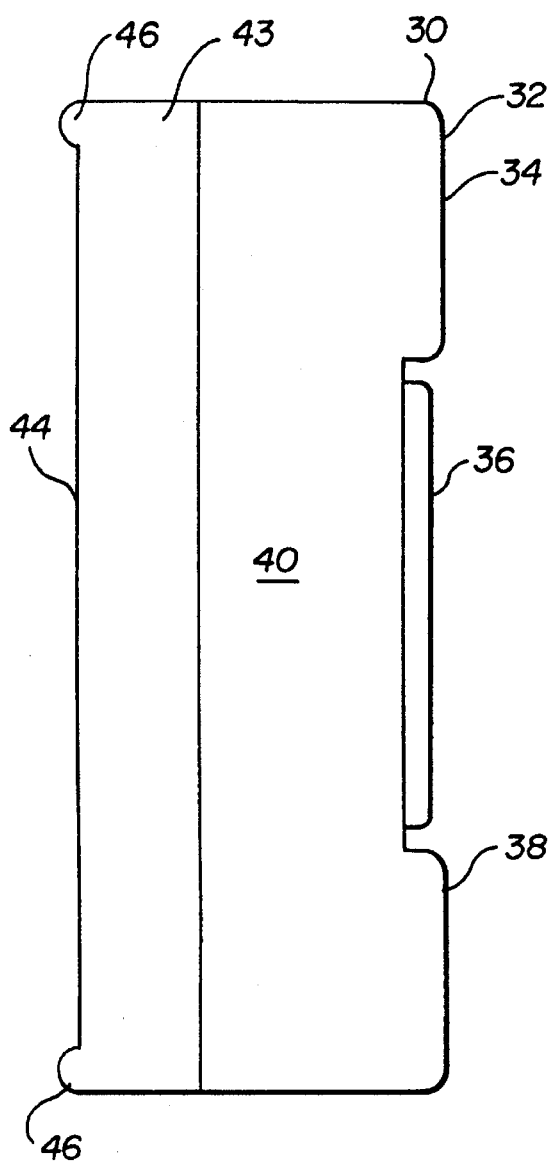
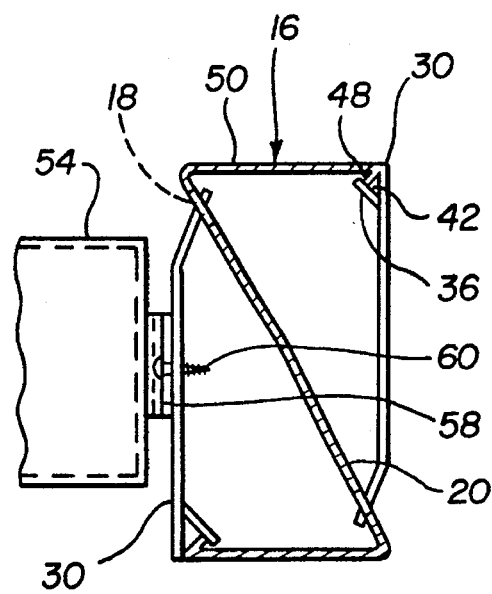
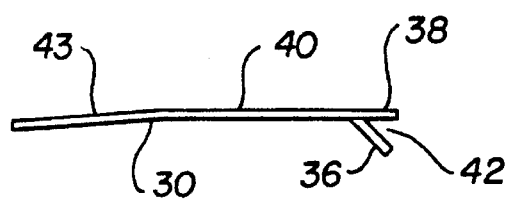
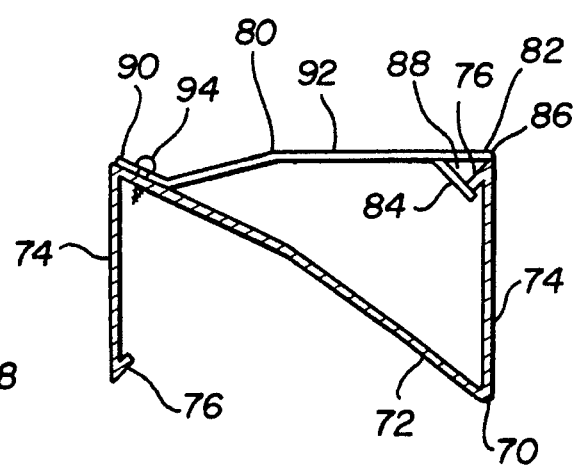

UTILITY BOX MOUNTING PLATE AND Z-STUD

FIELD AND BACKGROUND OF THE INVENTION

This invention relates to a stamped metal attachment plate adapted to be secured to a metal stud having an angled webs to the combination of such a plate with a stud such as a Z-stud, and to an improved Z-stud.

The most common vertical studs used in wall construction in the past have been wood 2×4's and C-shaped sheet metal screw studs. Both of these types of studs have at least one flat side which is perpendicular to the wall surface and thus suitable for mounting such things as electrical utility boxes and doors on the flat side.

Another form of vertical stud for use in wall construction is a Z-stud, such as disclosed in U.S. Pat. No. 5,079,884. As will be readily noted from the patent drawings, the Z-stud lacks a flat side perpendicular to the wall surface because the flanges are parallel and the web is at an angle to the wall surface. If an electrical utility box were attached to the angled web, the box would not be square with the wall surface, as is essential with most electrical utility boxes, such as boxes for wall switches and outlets. Other members such as doors also require mounting surfaces which are square with the wall surface.

Further, prior art Z-studs such as the stud described in the above-mentioned patent do not readily attach to mounting plates and are not readily attachable to, for example, a ceiling.

SUMMARY OF THE INVENTION

The present invention comprises a substantially flat, stamped, metal attachment plate for mounting on a stud having an angled web, such as a Z-stud. The stud has two flanges connected by an angled web, an inwardly directed narrow lip on an edge of one flange, and, preferably, a plurality of uniformly spaced slots in the web, the slots being near the opposite flange. The attachment plate preferably has at least three tongues along a first edge which engage the flange lip, the three tongues being alternately angled to form a V-groove which receives the flange lip. The attachment plate also preferably has at least two spaced projecting tabs on a second edge, the tabs fitting into spaced slots in the stud.

In a modified form of the invention, the stud slots and the attachment plate tabs are omitted, and the plate is affixed to the stud by the tongues on the first edge engaging the flange lip and by the second edge being fastened by screws to the stud web.

The invention further comprises an improved Z-stud design and method of mounting such a stud.

BRIEF DESCRIPTION OF THE DRAWINGS

The invention will be more apparent when considered in relation to the preferred embodiments as set forth in the specification and shown in the accompanying drawings wherein:

FIG. 2 is a plan view of an attachment plate in accordance with the invention and included in the apparatus of FIG. 1;

FIG. 3 is an end view of the attachment plate of FIG. 2;

FIG. 4 is a sectional view taken on line 4—4 of FIG. 1;

FIG. 6 is a sectional view somewhat similar to FIG. 4 but showing a modified form of attachment plate.

DETAILED DESCRIPTION OF THE INVENTION

Figure 1:
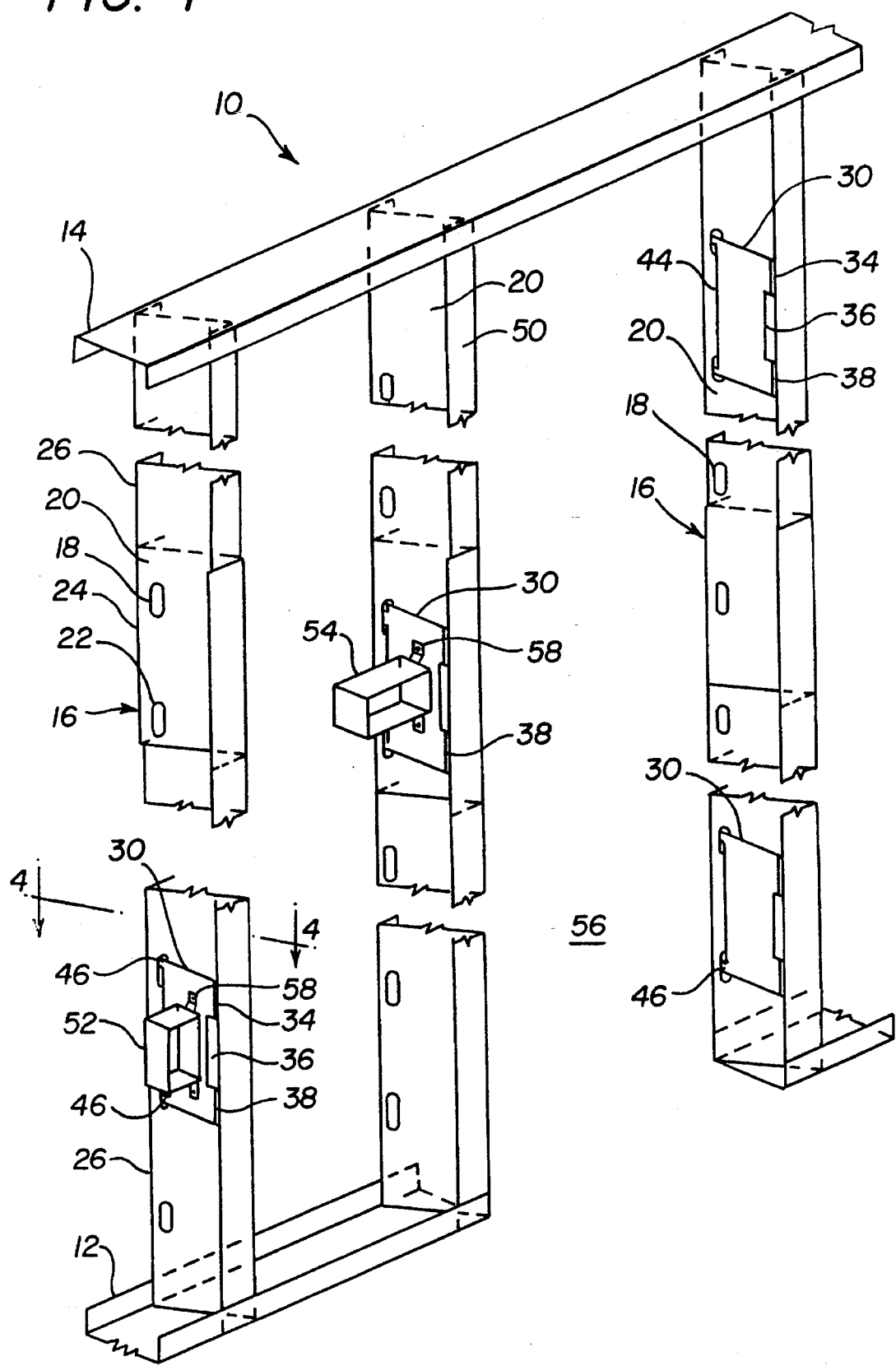
FIG. 1 is a perspective view of the framework of a short section of a wall, including a doorway, including apparatus in accordance with this invention.
Figure 7:
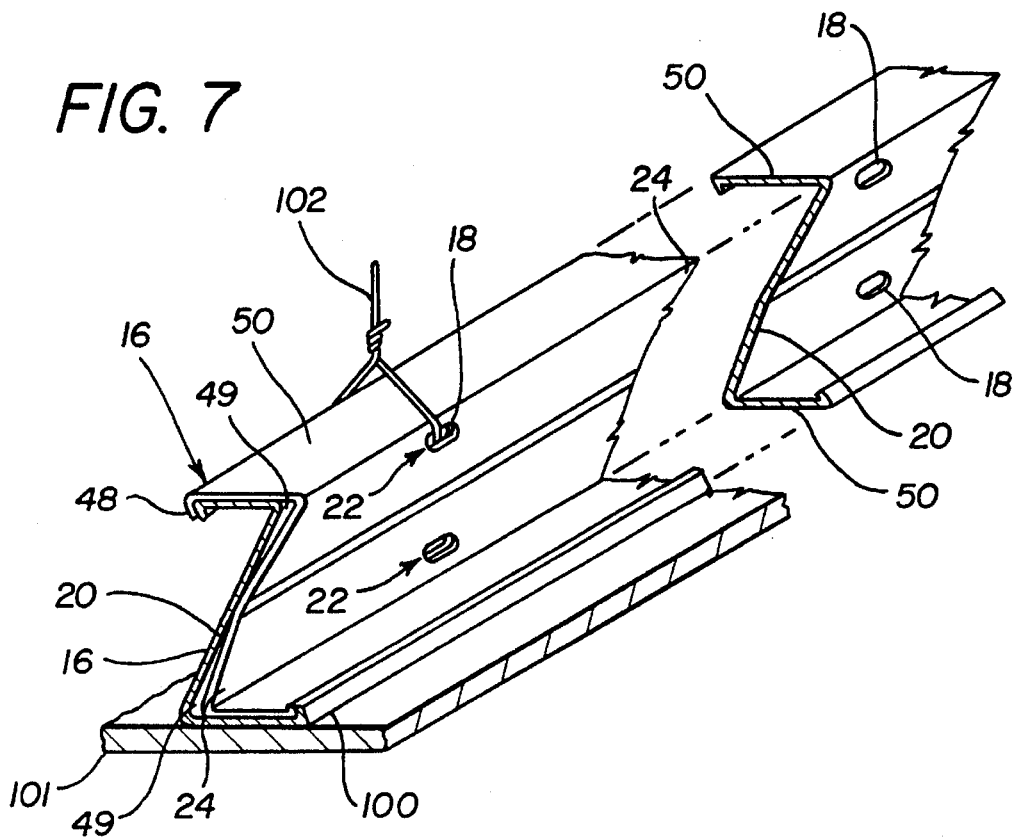
FIG. 7 is a perspective view of a slotted Z-stud in accordance with this invention, suspended by tie wires, to function as a horizontal framing member in a drop ceiling.

Referring to FIG. 1, there is shown a framework 10 of a section of a wall, including a floor runner 12, a ceiling runner 14, and a plurality of extendible Z-studs 16. The extendible Z-studs shown in FIGS. 1 and 17 are an improved form of the Z-stud disclosed in U.S. Pat. No. 5,079,884, the disclosure of which is incorporated herein by reference. Each stud includes two spaced, parallel flanges 50, and a web 20 connecting the flanges. One flange is slightly longer than the other so that two stud sections may overlap, as best illustrated in FIG. 7. The Z-studs 16 have been improved in accordance with the present invention in that a plurality of spaced holes or slots 18 are formed in the web 20 of each Z-stud 16.

The slots 18 are formed in two rows 22 (see FIG. 7), each row being closely adjacent an edge 24 of the web 20, only one row 22 being seen in each Z-stud 16 in FIG. 1.

The extendible Z-studs 16 shown in FIG. 1 are each formed of two identical Z-stud sections 26. As a specific example, each stud section is 4½ feet long, and they are interconnected to form an 8-foot, extendible Z-stud 16, plus or minus a few inches. The slots 18 in each row 22 are spaced apart 6 inches, with the first slot 18 at each end of each stud section 26 being 3 inches from the end of the stud section.

Several attachment plates 30 are shown in FIG. 1, with additional views of an attachment plate 30 in FIGS. 2–5. Attachment plate 30 is formed of a stamped steel plate; as a specific example, the steel plate is about 0.024-inch thick, being almost flat as shown in FIG. 3.

Attachment plate 30 is generally rectangular, with one side edge 32 (FIG. 2) being divided into three narrow elongate tongues 34, 36 and 38. The middle tongue 36 is bent to an angle of about 45° (see FIG. 3) relative to the extent of the tongues 34 and 38. In the preferred embodiment, the two tongues 34 and 38 are coplanar with the main body portion 40 of the plate 30. The angular relationship of the third tongue 36 (which is between the tongues 34 and 36) relative to the outer tongues 34 and 38 creates a V-groove 42 as seen in FIG. 3. Plate 30 also has a minor body portion 43 angled slightly from main body portion 40.

On the opposite side edge 44 of plate 30 are two small spaced tabs 46, coplanar with the minor body portion 43 and slightly narrower than the length of slots 18. In a specific example, the tabs 46 are ¼ inch wide and are located at the corners of the attachment plate 30. Attachment plate 30 is, in this specific example, 6¼ inches long, whereby the tabs 46 are spaced apart 6 inches, and thus are of a suitable size and spacing to fit into two adjacent slots 18 in a row 22 on a Z-stud 16.

Figure 5:
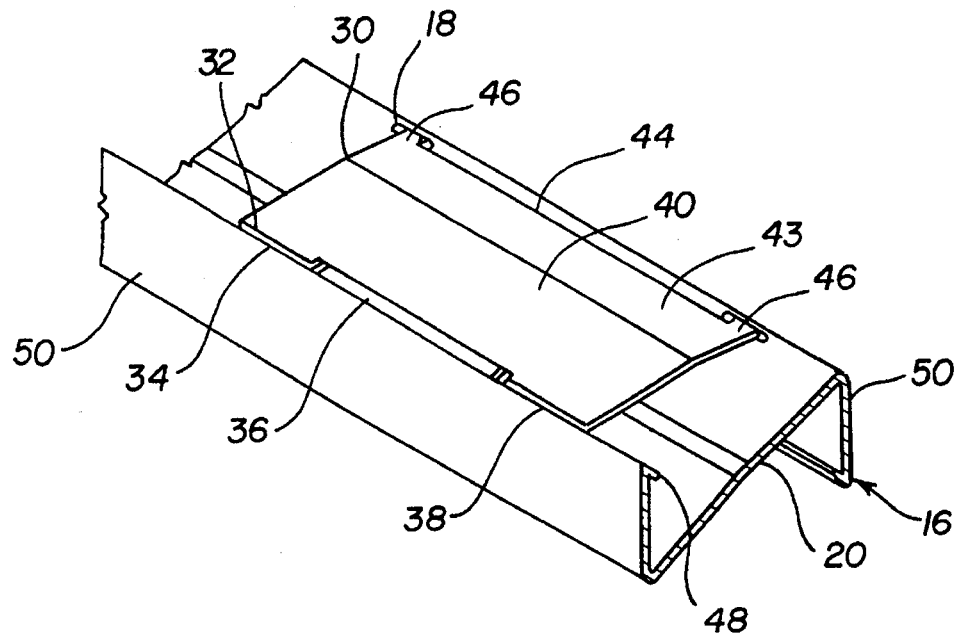
FIG. 5 is a perspective view of a section of Z-stud with an attachment plate affixed thereon.

Each flange 50 and 50a has an inwardly directed lip 48 (FIGS. 4 and 5) at its edge. An attachment plate 30 is affixed to a Z-stud 16 by placing an inwardly directed narrow lip 48 at the edge of a flange of a Z-stud section into the V-groove 42 of the attachment plate 30, flexing the plate to bow it slightly, and then forcing the two tabs 46 into two adjacent slots 18 as shown in FIG. 5.

With the slots 18 always located such that the first slot 18 is 3 inches from the bottom of a Z-stud 16 and all other slots 18 located at 6-inch increments, the center of an attachment plate will be located, at the lowest, at 6 inches from the bottom of the Z-stud 16, or at 6-inch increments thereabove. Accordingly, since wall outlets are commonly located one foot from the floor of a room and wall switches are commonly located 3½ feet from the floor of a room, it is easy, in accordance with this invention, to affix attachment plates 30 to the second and third slots 18 for mounting thereon an outlet electrical box 52, and to affix attachment plates 30 to the seventh and eight slots 18 for mounting thereon a wall switch electrical box 54.

With reference to the center of the three studs 16 shown in FIG. 1, an attachment plate 30 may also be mounted on a stud in the area where two stud sections overlap. The tabs 46 may be inserted into two slots 18 of one of the stud sections without interference by the other stud section because there are gaps or open spaces 49 (see FIG. 7) between the overlapping sections adjacent the ends of the web. Further, as shown in FIG. 4, two attachment plates may be attached to opposite sides of a stud at the same level, without interference between them.

As shown in FIG. 1, attachment plates 30 may also be affixed wherever desired on Z-studs 16 which are adjacent a doorway opening 56, to be used for mounting a door frame (not shown).

The electrical utility boxes 52 and 54 are attached to metal mounting straps 58 which are affixed by screws 60 (see FIG. 4) to the attachment plates 30. The boxes 52 and 54 may be attached to the attachment plate by any of several other means, and may be attached prior to affixing the attachment plate to a stud.

Referring to FIG. 6 which shows an alternative construction of the Z-stud and the mounting plate, a Z-stud 70 is shown which has no slots. The Z-stud 70 has an angled web 72, two flanges 74 and inwardly directed lips 76 on the outer edge of flanges 74. A modified attachment plate 80 is affixed to Z-stud 70, which includes alternately directed tongues 82 and 84, on one edge 86, similar to tongues 34, 36 and 38 on attachment plate 30. The tongues 82 and 84 form a V-groove 88 which receives a lip 76 on one flange of the Z-stud 70. The opposite edge 90 of the attachment plate 80 is bent to lie flat against web 72 adjacent the flange at the other side, and maintains the main body 92 of attachment plate 80 perpendicular to the flanges 74. Edge 90 is affixed by fasteners, such as screws 94 to web 72.

Referring to FIG. 7, the novel, extendible Z-studs 16 containing a plurality of slots 18 in the web 20 are clearly superior to the common C-shaped screw stud, when employed as horizontal members 100 in a drop ceiling for supporting a ceiling board 101. The extendible Z-studs 16 do not have to be cut to an exact length as do C-studs, and the slots 18 provide means for suspending these horizontal members with tie or hanger wires 102.

Having completed a detailed description of the preferred embodiments of our invention so that those skilled in the art may practice the same, we contemplate that variations may be made without departing from the scope of the invention.

What is claimed is:

1. An attachment plate for mounting on a stud and providing a side area on the stud, the stud having two parallel flanges and an angled web connecting the flanges, said attachment plate comprising a substantially flat, rectangular metal plate, said plate having opposed first and second side edges, said first side edge having a plurality of narrow, elongate tongues, each extending along a portion of and outwardly from said first side edge, said tongues being in different planes and forming, from an end view of said attachment plate, a V-groove, at least one of said flanges of the stud having an inwardly directed lip on an edge thereof and said V-groove being operable to receive said lip, and said second side edge having means for attaching said second side edge to said web adjacent the other of the flanges with said plate extending substantially perpendicular to said flanges.

2. An attachment plate as defined in claim 1, wherein said means for attaching said second side edge to said web comprises an edge portion bent to lie flat against said web.

3. An attachment plate as defined in claim 2, and further including fastener means for securing said edge portion to the web.

4. An attachment plate as defined in claim 1, wherein said means for attaching said second side edge to said web comprises a plurality of small tabs spaced apart along said second side edge at a suitable distance for engaging spaced apart slots on said web.

5. An attachment plate as defined in claim 4, wherein some of said tabs are located at each end of said second side edge.

6. An attachment plate as defined by claim 1, wherein at least one of said tongues is in the same plane as a main body portion of said attachment plate.

7. In combination, a Z-stud and an attachment plate, said Z-stud having two parallel flanges and an angled web connecting the flanges, said attachment plate comprising a generally flat, rectangular metal plate, said plate having opposed first and second side edges, said first side edge having a plurality of narrow, elongate tongues, each extending along a portion of said first side edge, said tongues being in different planes and forming, from an end view of said attachment plate, a V-groove, at least one of said flanges having an inwardly directed lip on an edge thereof and said V-groove being operable to receive said lip, and said second side edge having means for attaching said second side edge to said web adjacent the other of the flanges with said plate extending substantially perpendicular to said flanges, said Z-stud further having said angled web and said parallel flanges extending in opposite directions from edges of said angled web, each of said flanges having said inwardly directed lip on the edge thereof, said inwardly directed lip on said one flange extending into said V-groove on said first side edge of said attachment plate, said second side edge of said attachment plate being affixed to said angled web closely adjacent the other of said flanges.

8. The combination of claim 7, wherein said second side edge of said attachment plate is bent to lie flat against said Z-stud web, and a fastener secures said plate to said web.

9. The combination of claim 7, wherein said second side edge of said attachment plate has a plurality of small tabs spaced apart along said second side edge and said Z-stud web has a plurality of slots aligned in a row, spaced apart suitably for reception of said tabs, said tabs being firmly held within said slots.

10. The combination of claim 9, wherein said tabs are located at each end of said second side edge.

11. The combination of claim 10, wherein said attachment plate has a length equal to the spacing between said slots plus the width of one of said tabs.

12. The combination of claim 7, wherein at least one of said tongues is in the same plane as a main body portion of said attachment plate.

13. The method of mounting an attachment plate on a Z-stud, the Z-stud including first and second flanges and an angled web between said flanges, said plate providing a mounting surface perpendicular to said flanges, comprising the steps of forming an inwardly directed lip on an edge of said first flange, forming a plurality of narrow tongues on one side of a generally flat metal plate, bending said tongues to form a V-groove, engaging said inwardly directed lip in said V-groove, and affixing an opposite side of said metal plate to said angled web closely adjacent said second flange.

14. The method of claim 13, comprising the further step of screwing said opposite side of said metal plate to said angled web.

15. The method of claim 13, and further comprising the step of forming a plurality of tabs spaced apart along said second side edge, forming a plurality of spaced slots aligned in a row along said web closely adjacent said second flange, and engaging said tabs in said slots.

16. The method of claim 15, wherein said step of forming of said slots includes spacing said slots at even spacings suitable for locating electrical utility boxes at suitable desired heights in a wall.

17. The method of claim 13, further comprising the step of attaching an electrical box to said attachment plate.

18. The method of claim 13, further comprising the step of affixing a door frame to said attachment plate.

* * * * *

UNITED STATES PATENT AND TRADEMARK OFFICE
CERTIFICATE OF CORRECTION

PATENT NO. : 5,483,777
DATED : January 16, 1996
INVENTOR(S) : ROBERT J. MENCHETTI ET AL.

It is certified that error appears in the above-identified patent and that said Letters Patent is hereby corrected as shown below:

Column 1, line 8, "angled webs" should be --angled web,--.

Signed and Sealed this

Thirty-first Day of December, 1996

Attest:

BRUCE LEHMAN

*Attesting Officer*  *Commissioner of Patents and Trademarks*